United States Patent [19]

Oshita

[11] Patent Number: 5,305,117
[45] Date of Patent: Apr. 19, 1994

[54] FACSIMILE APPARATUS WITH IMPROVED PRINT REDUCTION MODE

[75] Inventor: Fumiyo Oshita, Hyogo, Japan

[73] Assignee: Mitsubishi Denki Kabushiki Kaisha, Tokyo, Japan

[21] Appl. No.: 729,207

[22] Filed: Jul. 12, 1991

[30] Foreign Application Priority Data

Oct. 31, 1990 [JP] Japan ................................ 2-96352

[51] Int. Cl.⁵ .................................... H04N 001/393
[52] U.S. Cl. .................................... 358/451; 358/401; 382/47
[58] Field of Search ............. 358/401, 438, 449, 451, 358/296, 528; 382/47; H04N 3/393

[56] References Cited

U.S. PATENT DOCUMENTS

| | | | |
|---|---|---|---|
| 4,568,973 | 2/1986 | Ishida | 358/449 |
| 4,885,641 | 12/1989 | Kato | 358/451 |
| 5,019,916 | 5/1991 | Ogura | 358/401 |
| 5,150,224 | 9/1992 | Mizude et al. | 358/449 |

FOREIGN PATENT DOCUMENTS

0037873 2/1985 Japan ................................ 358/401
2173972 10/1986 United Kingdom .

*Primary Examiner*—Edward L. Coles, Sr.
*Assistant Examiner*—Jill Jackson
*Attorney, Agent, or Firm*—Rothwell, Figg, Ernst & Kurz

[57] ABSTRACT

A facsimile apparatus according to the present invention handles a record paper having a predetermined length (for example, the A4 size) in size in a sub-scanning direction and has a function of reducing a received picture to a preset size. When a line number of a received picture is smaller than an effective print line number of a record sheet, even if a size is set in advance for reduction, the received picture is printed on a record sheet without being reduced.

1 Claim, 4 Drawing Sheets

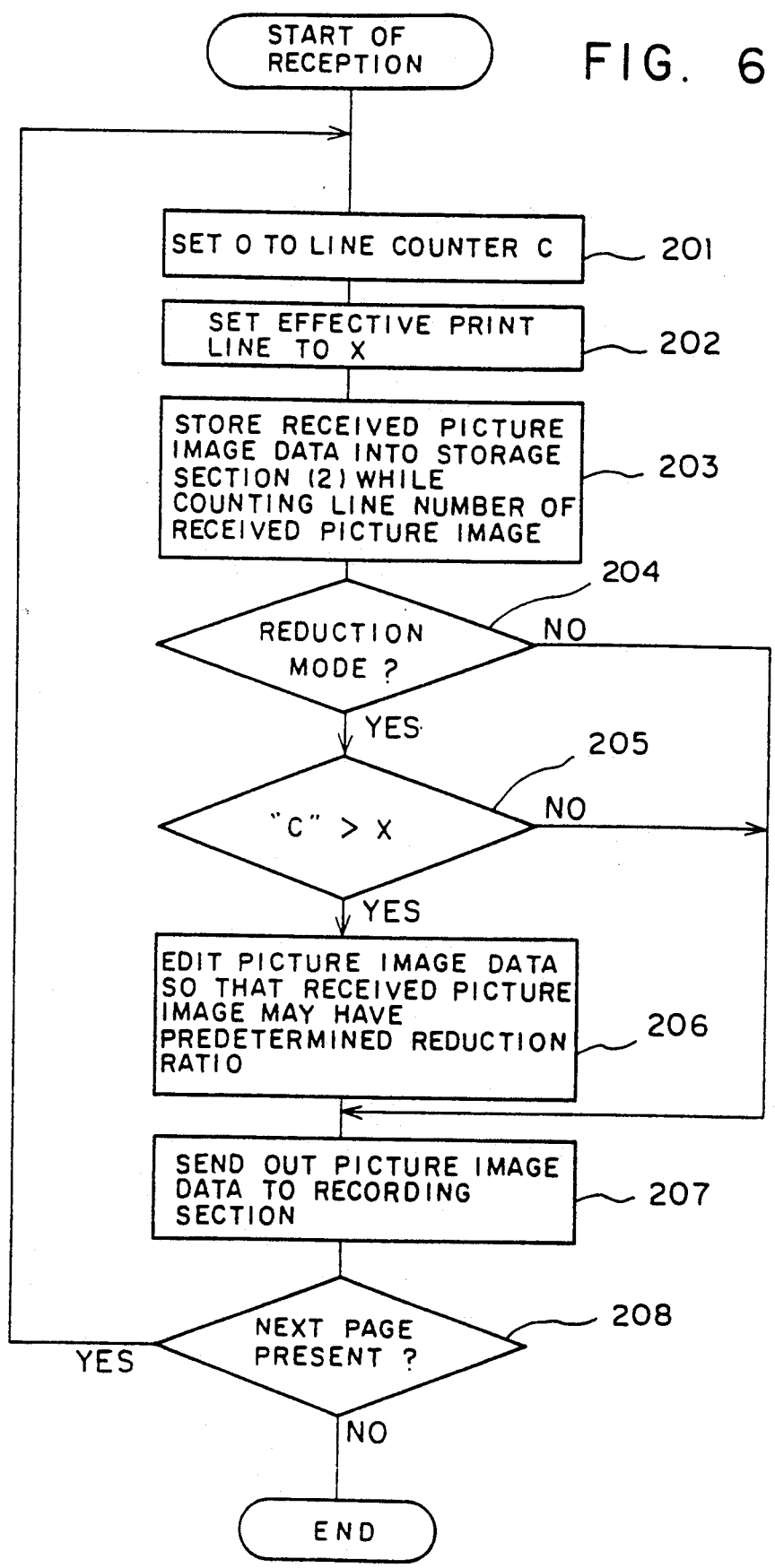

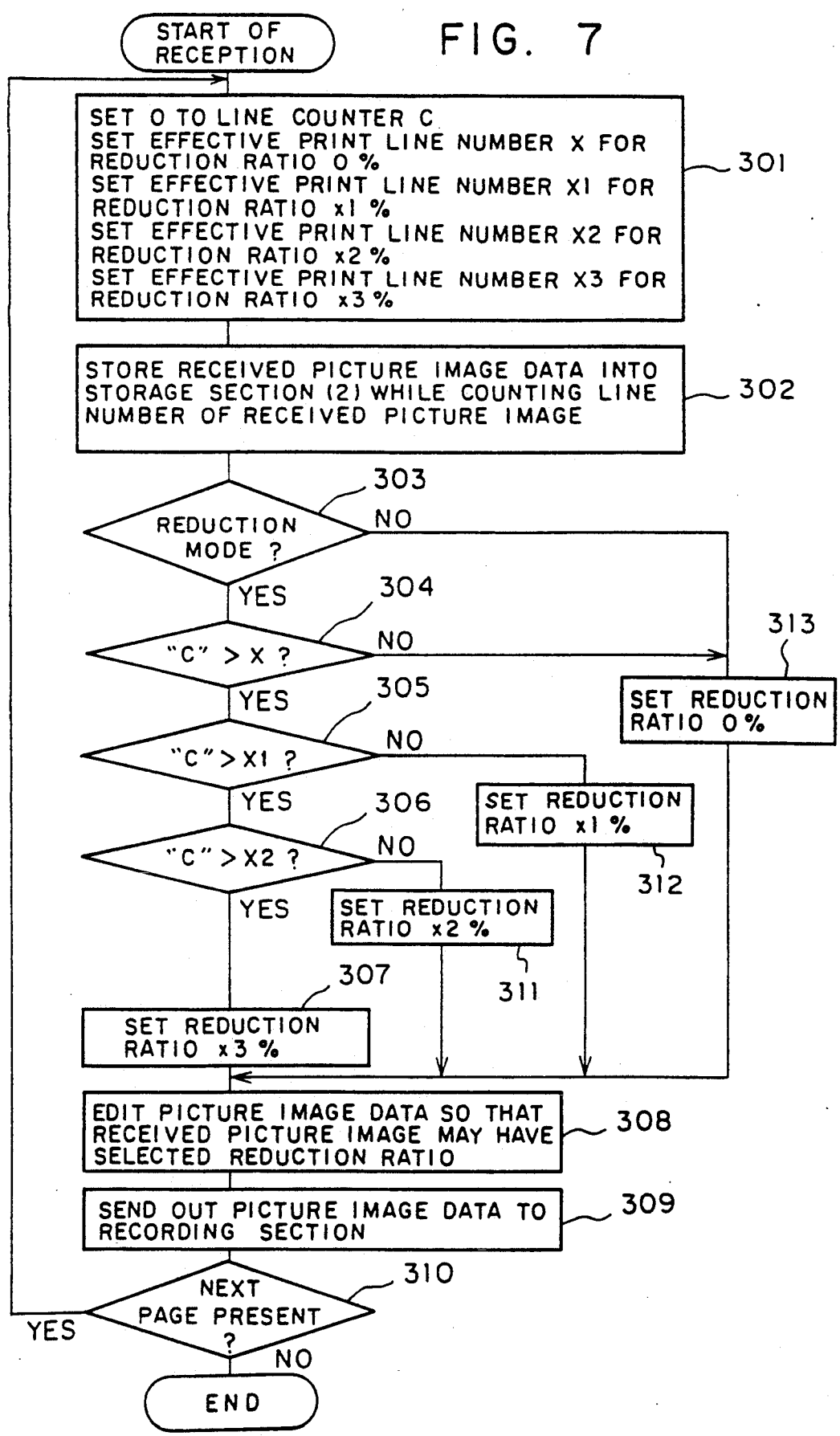

FACSIMILE APPARATUS WITH IMPROVED PRINT REDUCTION MODE

BACKGROUND OF THE INVENTION

1. Field of the Invention

This invention relates to a facsimile apparatus having a recording section in which a regular size record sheet is used.

2. Description of the Prior Art

Basic construction of a conventional facsimile apparatus is shown in FIG. 1. Reference numeral 1 denotes a display section for displaying a method of operation and so forth thereon, 2 an operating section for setting of a printing mode and so forth, 3 a controlling section for controlling signal transmitting and receiving operations and a copying operation in response to signals from the operating section 2 and so forth, 4 a storage section for storing a printing mode and so forth therein, 5 a recording section for performing printing on a regular size record sheet (cut sheet), 6 a modulating-/demodulating section, and 7 a network controlling section. Reference numeral 100 denotes a telephone line.

The present apparatus has a reduction printing function in addition to a normal printing function, and a user will set a reduction mode by way of the operating section 3 when it is considered necessary. Such setting operation is performed, for example, in such a manner as shown in FIGS. 2 to 4. First, the user will depress a "display change-over" button as shown in (a) of FIG. 2 to put the display status into a printing mode. Consequently, such instruction as shown in (b) of FIG. 2 is displayed on a display portion of the display section 1. Then, if a "start" button is depressed as shown in (a) of FIG. 3 in accordance with the instruction displayed on the display portion of the display section 1, then setting of a sub-scanning 95% reduction mode is made available and such information as seen in (b) of FIG. 3 is displayed. Then, if a "1" button is depressed as shown in (a) of FIG. 4, then such sub-scanning 95% reduction mode is set, and the indication on the display portion of the display section 1 is changed over to such an indication as seen in (b) of FIG. 4. When signal reception is to be performed in this condition, the controlling section 3 reads data for the reduction printing from the storage section 4, make a picture in accordance with such data and sends out the thus picture to the recording section 5. The record section 5 thus prints out the picture in a reduced scale.

In such a conventional facsimile apparatus as described above, if a reduction mode is used, a received picture having a number of lines for a page which exceeds a number of effective print lines of a regular size record sheet (=an effective sub-scanning length of a record sheet x a sub-scanning line density) can be printed on a record sheet. However, in a set condition of a reduction mode, even a received picture which can be included sufficiently in a record sheet even if it remains in an original size will be reduction printed at a set reduction ratio. Accordingly, there are such problems that the picture quality is deteriorated unnecessarily, that a useless blank portion may appear on a record sheet and so forth.

SUMMARY OF THE INVENTION

It is an object of the present invention to provide a facsimile apparatus which automatically selects, in a set condition of a reduction mode, reduction printing or original size printing in response to a number of lines of a received picture to eliminate unnecessary reduction printing.

In accordance with the present invention, there is provided a facsimile apparatus including a recording section in which a regular size record sheet is used, which comprises a storage section for storing received picture image data therein, reduction mode setting means, comparing means for comparing a received line number of a page with an effective print line number of a record sheet, and controlling means for producing, when reduction is judged necessary in accordance with a result of comparison by the comparing means in a condition wherein a reduction mode is set, reduced picture image data, which are reduced at a predetermined reduction ratio with respect to data stored in the storage section, from the data stored in the storage section and sending out the thus reduced picture image data to the recording section.

If a reduction mode is set by the reduction mode setting means, then when a signal is received by the facsimile apparatus, the comparing means compares a line number of a received picture with an effective print line number of a record sheet and sends a result of such comparison to the controlling means. The controlling means thus determines, in accordance with the result of comparison, whether reduction must necessarily be performed or not, and if reduction is determined necessary, then the controlling means produces, from data stored in the storage section, reduced picture image data which are reduced at a predetermined reduction ratio.

BRIEF DESCRIPTION OF THE DRAWINGS

FIG. 6 is a flow chart illustrating an example of operation of a controlling section of the facsimile apparatus of FIG. 5; and FIG. 7 is a flow chart illustrating another example of operation of the controlling section of the facsimile apparatus of FIG. 5.

DETAILED DESCRIPTION OF THE PREFERRED EMBODIMENTS

Figure 1:
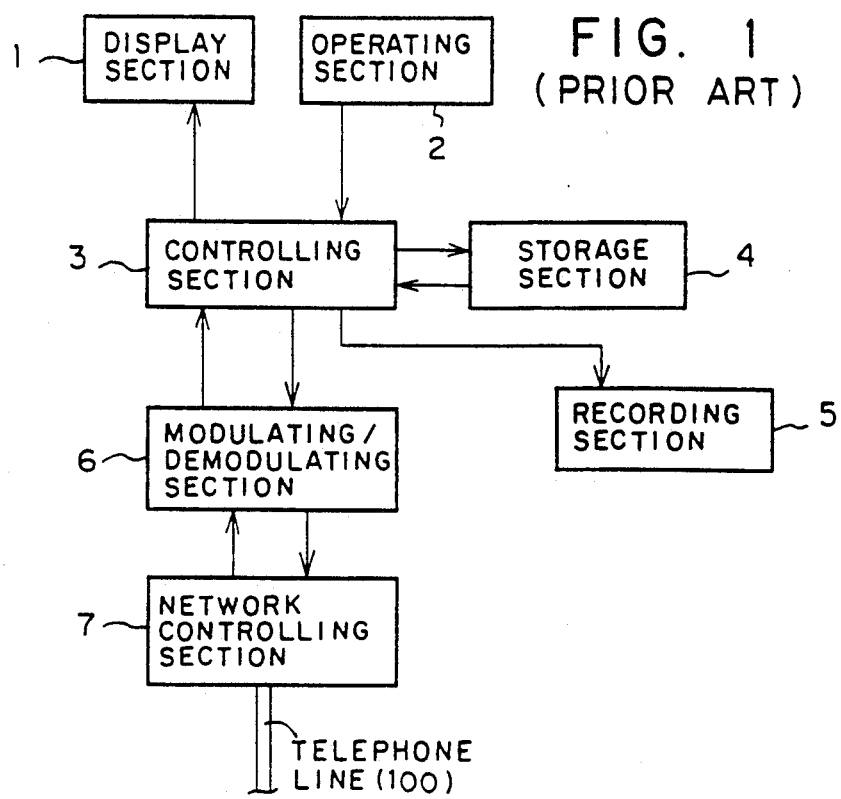
FIG. 1 is a block diagram showing a conventional facsimile apparatus.
Figure 5:
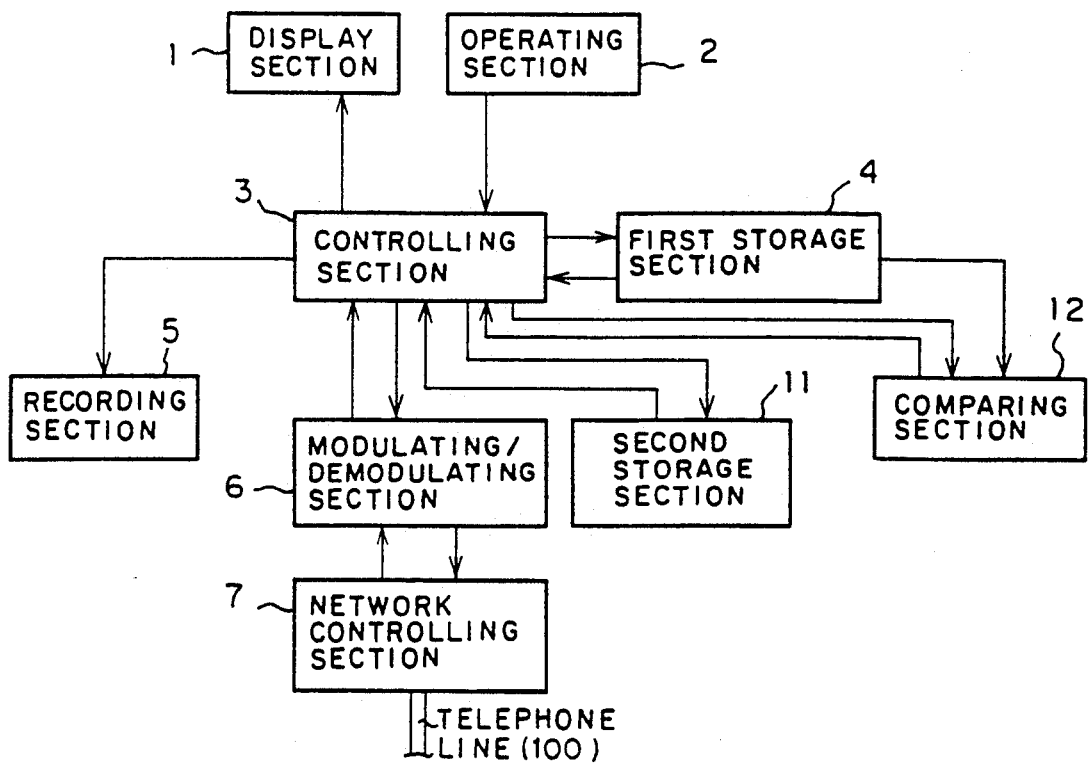
FIG. 5 is a block diagram showing a facsimile apparatus according to an embodiment of the present invention.
Figure 2A:
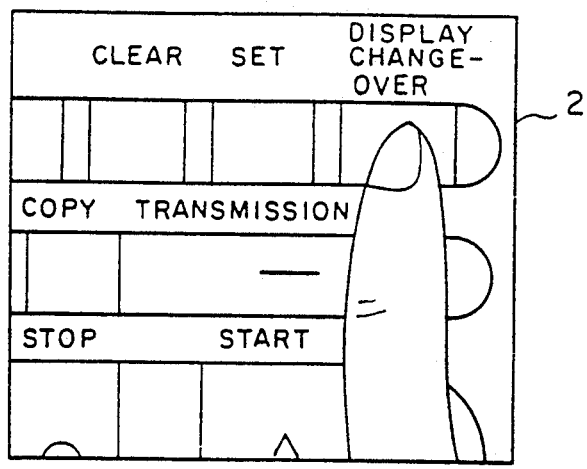
FIG. 2(a) is a diagrammatic view of a portion of the operating section of the apparatus of FIG. 1 illustrating a setting method for setting a print mode.
Figure 2B:
FIG. 2(b) is an illustration of a displayed instruction resulting from the method illustrated in FIG. 2(a)
Figure 3A:
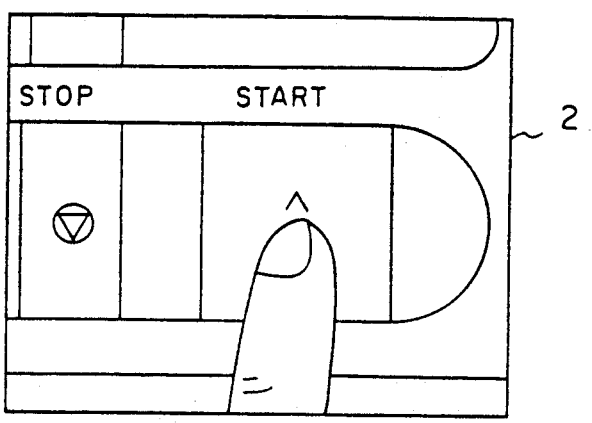
FIG. 3(a) is a diagrammatic view of a portion of the operating section of the apparatus of FIG. 1 illustrating a setting method for setting a reduction mode.
Figure 3B:
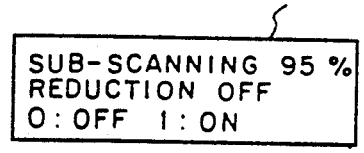
FIG. 3(b) is an illustration of a displayed instruction resulting from the method illustrated in FIG. 3(a)
Figure 4A:
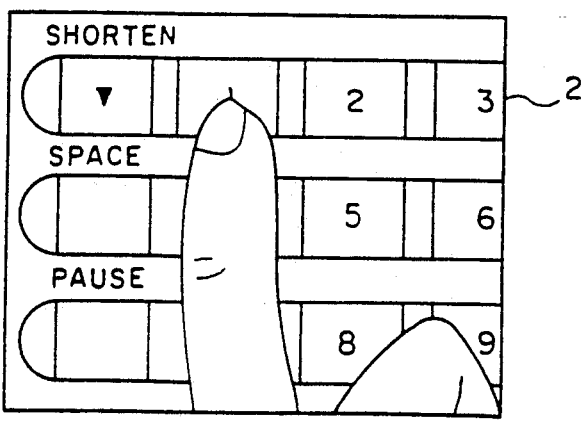
FIG. 4(a) is a diagrammatic view of a portion of the operating section of the apparatus of FIG. 1 illustrating a setting method for setting a reduction ratio.
Figure 4B:
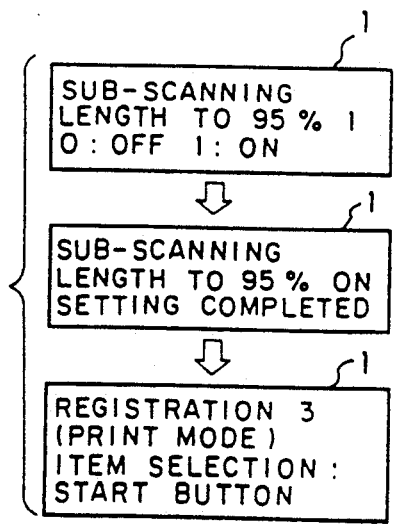
FIG. 4(b) is an illustration of displayed instructions resulting from the method illustrated in FIG. 4(a)

FIG. 5 is a block diagram showing an embodiment of the present invention. In FIG. 5, like parts or elements in FIG. 1 are denoted by like reference numerals, but in the present embodiment, a facsimile apparatus includes, in addition to a first storage section 4 similar to the storage section 4 shown in FIG. 1, a second storage section 11 for temporarily storing received picture image data for each page therein, and a comparing section 12. Setting of a reduction mode is performed by selective operation by a user of a plurality of keys provided on an operating section 2 similarly as in the case of the conventional facsimile apparatus described hereinabove. It is to be noted that a controlling section 3 may be realized, for example, by a microcomputer system. Operation of the facsimile apparatus of the present embodiment will be described subsequently with reference to a flow chart of FIG. 6.

When a signal is received by the facsimile apparatus, the controlling section 3 sets "0" to a line counter C provided in the first storage section 4, and then sets an effective print line number X of a record sheet to be used in the recording section 5 into a register provided similarly in the first storage section 4, whereafter it stores received image data into the second storage section 11 while counting a number of lines of a received picture image (steps 201 to 203). Then, if the facsimile apparatus is in a condition wherein a reduction mode is set by way of the operating section 2 (step 204), then the comparing section 12 is caused to start its operation. The comparing section 12 compares, after completion of reception of data for one page, a count value "C" of the line counter C with the data X indicative of the effective print line number and sends out a result of such comparison to the controlling section 3.

In case it is judged that the count value "C" is so high that all lines of the received picture cannot be included in an effective print area of a record sheet (step 205), the controlling section 3 edits the received picture image data stored in the storage section 11 into picture image data reduced at a predetermined reduction ratio and sends out the thus edited picture image data to the recording section 5 (steps 206 and 207). Such a sequence of operations as described so far is repeated for each page (step 208).

Even if a reduction mode is set, in case all lines of a received picture image can be included in an effective print area of a record sheet, received picture image data stored in the storage section 11 are sent out as they are to the recording section 5. Also when no reduction mode is set, received picture image data in the storage section 11 are sent out similarly as they are to the recording section 5.

Since such reduction ratio is fixed in the present embodiment, the facsimile apparatus of the present embodiment is effective, when reduction is required, in case the ratio of reduction is supposed to be substantially fixed.

On the other hand, in case widely different received pictures are forecast, it is effective to permit the reduction ratio to be determined in accordance with a number of lines of a received picture.

An example of such processing is shown in FIG. 7. The controlling section 3 sets "0" to the line counter C provided in the first storage section 4 and then sets, into the register provided in the first storage section 4, an effective line number X for the case wherein the reduction ratio is 0% and consequently a received picture is printed as it is without being reduced as well as effective line numbers X1, X2 and X3 for the cases wherein a received image is reduction printed at reduction ratios x1%, x2% and x3%, respectively [$X<X1<X2<X3$, each of X1 to X3 is a value obtained by dividing the effective print line number X by (100−each of the reduction ratios x1 to x3)/100, respectively] (step 301).

Then, the controlling section 3 stores received picture image data into the storage section 11 while counting a number of lines of a received picture image (step 302), and then if a reduction mode is set (step 303), then the comparing section 12 compares a count value "C" of the line counter C successively with data indicative of the effective print line numbers for the individual reduction ratios.

If the count value "C" is higher than X and X1 and further higher than X2, then the reduction ratio is set to the x3% (steps 304 to 307), and then the received picture image data are edited into reduced picture image data in accordance with the thus set reduction ratio x3 and the reduced picture image data obtained are sent out to the recording section 5 (steps 308 and 309). Similar processing is performed for each page (step 310).

If the counter value "C" is higher than X and X1 but lower than X2, then the reduction ratio is set to the x2% (step 311), and the received picture image data are edited into reduced picture image data in accordance with the ratio x2. On the other hand, if the count value "C" is higher than X but lower than X1, then the reduction ratio is set to the x1%, but otherwise if the count value "C" is lower than X, then the reduction ratio is set to 0% (step 312 or 313). In the last case, reduction is not performed in fact, but original size printing will be performed.

In either case, if a reduction mode is not set, then original size printing is performed. In this instance, if a received line number of a page exceeds an effective print line number of a record sheet, then the received picture image data will be printed on a plurality of successive record sheets.

While a reduction ratio is selected from among predetermined several values in the embodiment described above, a reduction ratio may otherwise be set continuously in accordance with a degree at which a received line number exceeds an effective print line number of a record sheet. In this instance, an upper limit may be provided for the reduction ratio in order to prevent such a possible situation that a picture image is printed at such a high reduction ratio that it cannot be visually discerned.

It is to be noted that, while the comparing section 12 and the controlling section 3 are provided separately from each other, the controlling section 3 which may be constituted from a microcomputer system or the like may otherwise execute similar comparison to that executed by the comparing section 12.

As described so far, according to the present invention, a facsimile apparatus comprises a storage section for storing received picture image data therein, reduction mode setting means, comparing means for comparing a received line number of a page with an effective print line number of a record sheet, and controlling means for producing, when reduction is judged necessary in accordance with a result of comparison by the comparing means in a condition wherein a reduction mode is set, reduced picture image data, which are reduced at a predetermined reduction ratio with respect to data stored in the storage section, from the data stored in the storage section and sending out the thus produced reduced picture image data to a recording section. Accordingly, when reduction printing is not intended, or even when reduction printing is intended, such a possible situation can be prevented that the picture quality is deteriorated below an allowable degree or a useless blank portion is produced on a record sheet by unnecessary or excessive reduction.

What is claimed is:

1. A facsimile apparatus including a recording section in which a regular size record sheet is used, comprising a storage section for storing received picture image data therein, reduction mode setting means, comparing means for comparing a received line number of a page with an effective print line number of said record sheet on a page by page basis, and controlling means for producing, when a reduction mode is set and reduction is judged necessary in accordance with a result of comparison by said comparing means for each received line number of each page, reduced picture image data at a predetermined reduction ratio from the data stored in said storage section and sending out the thus produced reduced picture image data to said recording section for each record sheet;

said facsimile apparatus further comprising another storage section having areas of a counter to which a count value of said received line number is set and a register to which different effective print line numbers individually corresponding to a plurality of different reduction ratios are set; and wherein said comparing means compares said count value of said counter with said different effective print line numbers stored in said register after completion of reception of data for said page and, when the count value is higher than one of the effective print line numbers but lower than another one of the effective print line numbers, said controlling means determines that reduction should be performed at a reduction ratio corresponding to the latter effective print line number.

* * * * *